2,961,396

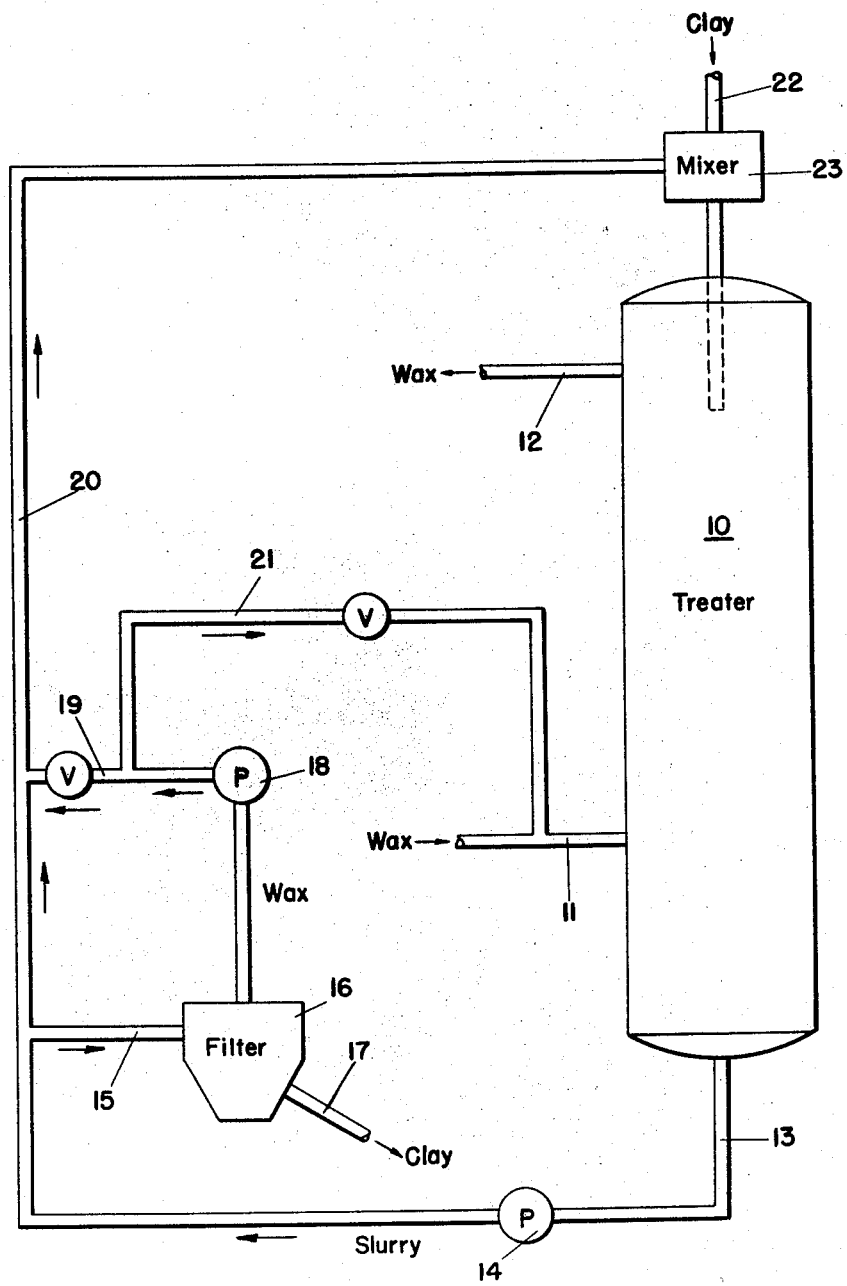

PROCESS FOR DECOLORIZING LUBE OIL AND WAX FRACTIONS WITH GRANULAR SOLIDS

Henry C. Beck, Wallingford, Pa., assignor to Sun Oil Company, Philadelphia, Pa., a corporation of New Jersey Filed July 3, 1957, Ser. No. 669,799

4 Claims. (Cl. 208—26)

This invention relates to a novel process for contacting liquid with granular solids, and more particularly to a process wherein granular solids pass downwardly in a hindered settling operation through a rising body of liquid.

In many industrial processes, particularly in the petroleum industry, it is desirable to contact a liquid material with granular solid material, usually in order to bring about some conversion or refining of liquid as a result of the contact with the granular solids. It is generally necessary in such processes to provide intimate and uniform contact of the liquid with the solids, and to provide a sufficient residence time of the liquid in contact with the solids.

A particularly desirable manner of operation is that in which the liquid charge stock is continuously introduced into a treating zone and a liquid product continuously withdrawn from the treating zone. It is desirable also to provide, in such operation, a manner of maintaining the activity of the solids for the refining or conversion in question at a substantially constant level. This can be done by continuously or periodically removing a portion of the solids which have been in use for an extended period of time and replacing the removed solids by fresh or regenerated solids in order to maintain the desired inventory and activity of solids in the system.

According to the present invention, a novel manner of contacting liquid with granular solids is employed which provides a desired combination, unobtainable in prior art processes, of characteristics including the features of continuous introduction of charge stock and removal of product, maintenance of activity of solids, provision of the necessary residence time of liquid in contact with solids, and a provision of a high degree of intimacy and uniformity of contact between liquid and solids.

The process according to the invention involves passing liquid upwardly through a contacting zone, passing granular solids downwardly through the contacting zone, removing a slurry containing liquid and solids from a lower part of the contacting zone, separating solids from a portion only of the slurry thus removed, returning the remainder of the slurry to an upper portion of the contacting zone, and introducing fresh or regenerated solids into the contacting zone to replace those separated from the aforementioned portion of the slurry.

The removal of solids from a portion of the slurry, and the replacement of the removed solids cooperate to maintain the activity of the solids in the system at the desired level. The recirculation of solids from a lower portion of the contacting zone to an upper portion thereof permits maintaining a condition of hindered settling of solids through a body of the liquid throughout most of the contacting zone. This condition is essential to the obtaining of optimum contact between solid and liquid.

It is necessary, according to the process of the invention, to withdraw solids from the lower portion of the contacting zone at a greater rate than that at which solids are permanently removed from the system. The rate of withdrawal from the lower portion of the contacting zone must be great enough to provide the necessary recirculation rate for maintenance of the desired hindered settling condition in the contacting zone. On the other hand, the rate of permanent removal of solids from the system must be low enough to obtain the optimum use of the solids in the contacting operation. Removal of the solids permanently from the system at a greater rate would result in wasting a portion of the activity of the solids for the refining or conversion in question.

The process according to the invention is particularly advantageous as applied to refining of petroleum paraffin or microcrystalline wax by means of a solid adsorbent such as clay, bauxite, etc., such processes being generally well known in the art. Other petroleum fractions such as jet fuel, gas oil, lubricating oil, etc. can also be treated. The temperature employed is sufficient to maintain the hydrocarbons to be treated in the liquid state at a sufficiently low viscosity for satisfactory contacting. Usually, the temperature is within the approximate range from 150° F. to 400° F.

The average ratio of liquids to granular solids on the volume basis in the contacting zone is preferably within the approximate range from 2 to 10 volumes of liquid per volume of granular solids. The ratio of liquid to granular solids in the slurry withdrawn from the lower portion of the contacting zone is preferably within the approximate range from 1 to 4 volumes of liquid per volume of solids.

The rate of withdrawal of solids from the lower portion of the contacting zone is preferably sufficient to remove in an hour 10 to 50% of the inventory of granular solids in the contacting zone, more preferably 10 to 30%. The residence time of solids in the contacting zone is therefore preferably within the approximate range from 2 to 10 hours. The residence time of the liquid in the contacting zone is preferably within the approximate range from 5 to 15 hours.

The rate of permanent removal of solids from the refining system is preferably sufficient to remove in an hour less than 10%, more preferably 1 to 5%, of the solids inventory in the contacting zone. In any event, the rate of permanent removal is less than the rate at which solids are removed from the lower portion of the contacting zone.

The invention will be further described with reference to the attached drawing, which is a schematic flowsheet of the process according to the invention.

Paraffin wax to be decolorized is introduced through line 11 into treater 10. A portion of the wax thus introduced passes upwardly through treater 10, in countercurrent contact with descending clay particles in treater 10, and the refined wax is withdrawn through line 12. The clay passes downwardly through the liquid wax in hindered settling operation and collects in a denser condition in the bottom of treater 10. A slurry containing for example about 25 parts by volume of clay and about 75 parts of wax is withdrawn through line 13 by means of pump 14. A portion of the slurry thus withdrawn is introduced through line 15 into rotary vacuum filter 16. It is to be understood that any suitable means for separating solid from liquid can be employed in place of the rotary vacuum filter 16.

Clay is filtered from the drag stream portion removed through line 15, and the filtered clay is withdrawn through line 17. The filtrate in one embodiment is conveyed by means of pump 18 through line 19 into line 20, through which the unfiltered portion of the slurry is returned by way of mixing vessel 23 to treater 10. The mixing of the filtrate with the unfiltered portion of the slurry increases the fluidity of the slurry, facilitating its conveyance through line 20.

In another embodiment, the filtrate is conveyed by means of pump 18 through line 21 and re-introduced into treater 10 at a lower level thereof, either by way of fresh feed line 11 as shown, or separately from the fresh feed. By introducing the filtrate into treater 10 at a location remote from the outlet 12 for the wax product, advantageous additional contact of the filtrate with granular solids prior to removal through line 12 is insured. However, introducing the filtrate into line 20 has the advantage pointed out previously of increasing the fluidity of the slurry passing through line 20. It is within the scope of the invention to introduce part of the filtrate through line 20 and part through line 21 into treater 10, or to withdraw all or part of the filtrate from the system.

Fresh or regenerated clay is introduced through line 22 and mixing vessel 23 into treater 10 in order to maintain the desired inventory of clay in the system, and also to maintain the desired activity of the clay in the system.

Suitable distributing means as known in the art for introducing granular solids into the upper portion of a contacting zone are employed in order to introduce the slurry of clay and wax into the upper portion of treater 10. The distributing means are preferably such as to provide a quiescent zone for the treated wax above the distributing means, from which zone the wax product is withdrawn through line 12. In the event that the wax product should contain a small amount of clay, the liquid wax is blotter pressed or otherwise treated according to known means to remove such clay.

The following example illustrates the invention:

A paraffin wax having melting point of 140° F. is treated with 20 to 60 mesh bauxite in the manner shown in the drawing. The average treating temperature is 200° F. The wax is charged to the treater, which is 20 feet high, at about 260 volumes (per unit time). The average volume ratio of wax to bauxite in the contacting zone is about 6. Slurry containing about one volume of bauxite per 3 volumes of wax is removed from the bottom of the treater at a rate of about 120 volumes. A 20 volumes drag stream is filtered to remove 5 volumes of bauxite containing about 5 volumes of wax associated therewith. The filtrate is recycled with the rest of the slurry to the top of the treater. Fresh bauxite is added at 5 volumes to maintain the bauxite inventory of about 300 volumes in the treater. Wax product is recovered at about 255 volumes per unit time. The residence time of wax in the treater is about seven hours and that of the bauxite in a single pass through the treater about ten hours.

The removal of bauxite from the treater at a rate of about 30 volumes per unit time and from the system at a rate of about 5 volumes per unit time, with recycle of the other 25 volumes, provides an operation wherein the full useful life of the bauxite is taken advantage of, the desired hindered settling condition in the treater maintained, and the necessary time of contact of wax with bauxite provided in the treater.

If the bauxite were removed at a too much lesser rate from the bottom of the treater, the average concentration of bauxite in the treater would become too high for optimum contact and decolorization. On the other hand, if bauxite were removed from the system at a too much greater rate, the full activity of the bauxite for decolorizing would not be used.

The invention claimed is:

1. A process for decolorizing petroleum fractions which comprises passing a liquid petroleum fraction selected from the group consisting of lubricating oil and liquefied wax upwardly through a contacting zone, passing granular solid adsorbent material in a hindered settling condition downwardly through said contacting zone, maintaining the average ratio of liquid to solid in said contacting zone within the approximate range from 2 to 10 volumes of liquid per volume of solid, removing from an upper portion of said contacting zone a liquid product containing the bulk of the petroleum fraction introduced into the contacting zone, removing from a lower portion of the contacting zone an effluent comprising excess liquid and the adsorbent material containing color bodies adsorbed from said petroleum fraction, maintaining the ratio of liquid to solid in said effluent within the approximate range from 1 to 4 volumes of liquid per volume of solid, said effluent being removed at a rate within the approximate range from 10 to 50 percent of the solids in said contacting zone per hour, separating from a portion of said effluent the adsorbent material contained therein and a material consisting essentially of said excess liquid, the rate of separation of adsorbent material being within the approximate range from 1 to 10 percent of the solids in said contacting zone per hour, directly returning the remainder of said effluent to an upper portion of said contacting zone, and introducing solids selected from the group consisting of fresh and regenerated solids into said contacting zone to replace those separated from said portion of the effluent, thereby to take advantage of the full useful life of the solids.

2. Process according to claim 1 wherein the separated excess liquid is returned with said remainder of said effluent to the upper portion of the contacting zone.

3. Process according to claim 1 wherein the separated excess liquid is returned with additional liquid petroleum fraction to a lower portion of the contacting zone.

4. Process according to claim 1 wherein the petroleum fraction is a liquefied paraffin wax.

References Cited in the file of this patent

UNITED STATES PATENTS

| | | |
|---|---|---|
| 2,537,999 | Hermanson et al. | Jan. 16, 1951 |
| 2,666,500 | Cahn et al. | Jan. 19, 1954 |
| 2,708,652 | Ackerman | May 17, 1955 |
| 2,834,721 | Payne | May 13, 1958 |